(12) United States Patent
Kojima (10) Patent No.: US 10,989,918 B2
(45) Date of Patent: Apr. 27, 2021

(54) OPTICAL SCANNER, IMAGE DISPLAY DEVICE, HEAD-MOUNTED DISPLAY, AND HEADS-UP DISPLAY

(71) Applicant: SEIKO EPSON CORPORATION, Tokyo (JP)

(72) Inventor: Hisako Kojima, Kai (JP)

(73) Assignee: SEIKO EPSON CORPORATION, Tokyo (JP)

(*) Notice: Subject to any disclaimer, the term of this patent is extended or adjusted under 35 U.S.C. 154(b) by 470 days.

(21) Appl. No.: 15/697,883

(22) Filed: Sep. 7, 2017

(65) Prior Publication Data

US 2018/0088329 A1 Mar. 29, 2018

(30) Foreign Application Priority Data

Sep. 28, 2016 (JP) .............................. JP2016-190000

(51) Int. Cl.
| | |
|---|---|
| *G02B 26/08* | (2006.01) |
| *G02B 27/01* | (2006.01) |
| *G01C 21/36* | (2006.01) |

(52) U.S. Cl.
CPC ....... *G02B 27/0103* (2013.01); *G01C 21/365* (2013.01); *G02B 27/0149* (2013.01);
(Continued)

(58) Field of Classification Search
CPC ........ G02B 26/00; G02B 26/02; G02B 26/08; G02B 26/0816; G02B 26/0833; G02B 26/105; G02B 26/085; G02B 26/0841; G02B 26/10; G02B 26/101; G02B 27/01; G02B 27/017; G02B 27/0149; G02B 27/0176; G02B 27/0103;
(Continued)

(56) References Cited

U.S. PATENT DOCUMENTS

| 9,091,856 B2* | 7/2015 | Mihara ................ G02B 26/105 |
| 2002/0149072 A1* | 10/2002 | Mutoh .................. B81B 3/0072 |
| | | 257/415 |
| 2008/0218823 A1 | 9/2008 | Mizoguchi |
| 2013/0301100 A1* | 11/2013 | Mizoguchi ......... G02B 26/0816 |
| | | 359/221.2 |

(Continued)

FOREIGN PATENT DOCUMENTS

| JP | 2008-216920 A | 9/2008 |
| JP | 2010-054944 A | 3/2010 |

(Continued)

*Primary Examiner* — Stephone B Allen
*Assistant Examiner* — Jyotsna V Dabbi
(74) *Attorney, Agent, or Firm* — Oliff PLC (57) ABSTRACT

An optical scanner includes a movable portion having a movable plate on which a light reflecting portion is provided, a frame body portion provided surrounding the movable portion when viewed in a planar manner, a first axis portion that oscillatably supports the movable portion around a first oscillation axis, a second axis portion that oscillatably supports the frame body portion around a second oscillation axis, which intersects the first oscillation axis, and a permanent magnet provided in the frame body portion, in which the movable portion has a projection portion, which is disposed overlapping the first oscillation axis within a region that does not overlap with the permanent magnet when viewed in a planar manner, and which projects, from the movable plate, further to the permanent magnet side than the first axis portion.

20 Claims, 9 Drawing Sheets

(52) U.S. Cl.
CPC ........... *G02B 2027/0105* (2013.01); *G02B 2027/015* (2013.01); *G02B 2027/0109* (2013.01); *G02B 2027/0154* (2013.01); *G02B 2027/0169* (2013.01)

(58) Field of Classification Search
CPC .... G02B 2027/0105; G02B 2027/0109; G02B 2027/015; G02B 2027/0154; G02B 2027/0169; G01C 1/365; Y10T 29/49002; H01F 2007/068
USPC ........ 359/13, 15, 198.1–199.4, 200.6–200.8, 359/202.1, 221.2, 223.1–225.1, 226.2, 359/904, 290–295, 838, 846, 871, 872; 250/204, 559.06, 559.29, 230, 234; 347/255–260; 353/39, 98–99; 385/15–18, 22; 398/12, 19, 45
See application file for complete search history.

(56) References Cited

U.S. PATENT DOCUMENTS

| | | | |
|---|---|---|---|
| 2013/0321889 A1* | 12/2013 | Mizoguchi | G02B 26/10 |
| | | | 359/199.3 |
| 2014/0177020 A1 | 6/2014 | Hino et al. | |
| 2015/0009236 A1* | 1/2015 | Saito | G02B 27/017 |
| | | | 345/656 |

FOREIGN PATENT DOCUMENTS

| | | |
|---|---|---|
| JP | 2010-060592 A | 3/2010 |
| JP | 2010-128116 A | 6/2010 |
| JP | 2011-048229 A | 3/2011 |
| JP | 2011-095290 A | 5/2011 |
| JP | 2013-101199 A | 5/2013 |
| JP | 2014-123020 A | 7/2014 |

\* cited by examiner

OPTICAL SCANNER, IMAGE DISPLAY DEVICE, HEAD-MOUNTED DISPLAY, AND HEADS-UP DISPLAY

BACKGROUND

1. Technical Field

The present invention relates to an optical scanner, an image display device, a head-mounted display, and a heads-up display.

2. Related Art

For example, an optical scanner that is used in a projector, a head-mounted display, or the like, and scans with light in a two-dimensional manner is known (for example, refer to JP-A-2008-216920).

For example, the optical scanner disclosed in JP-A-2008-216920 includes a frame form drive member, a pair of first axis members that support the drive member in a pivotable manner around an X axis, a movable plate that is provided on an inner side of the drive member and is provided with a light reflecting portion, a pair of second axis members that support the movable plate in a pivotable manner around a Y axis, which is orthogonal to the X axis, relative to the drive member, a permanent magnet provided in the drive member, and a coil provided so as to face the permanent magnet. Further, as a result of overlapping a first voltage and a second voltage having different frequencies (drive frequency) from one another and applying the voltages to the coil, the movable plate is caused to pivot around the Y axis at the frequency of the second voltage while causing the movable plate to pivot around the X axis at the frequency of the first voltage. As a result of this, it is possible to scan light reflected by the light reflecting portion of the movable plate in a two-dimensional manner.

In the optical scanner disclosed in JP-A-2008-216920, it is necessary to increase the thickness of the entire movable plate in order to reduce an increase in dynamic bending (deformation due to an inertial force) of the movable plate. In this instance, since the thickness of the axis member that supports the movable plate is the same as the thickness of the movable plate, when the thickness of the movable plate is increased, it is necessary to increase the length of the axis member in conjunction with this, and therefore, there is a problem in that this results in an increase in the size of the optical scanner.

SUMMARY

An advantage of some aspects of the invention is to Provide an optical scanner capable of reducing dynamic bending of the movable plate and realizing highly-accurate optical scanning characteristics while reducing an increase in the size of the optical scanner due to an increase in the thickness of the movable plate, and to provide an image display device, a head-mounted display, and a heads-up display provided with the optical scanner.

The advantage can be achieved by the following invention.

According to an aspect of the invention, there is provided an optical scanner including a movable portion having a movable plate on which a light reflecting portion, which reflects light, is provided, a frame body portion provided surrounding the movable portion when viewed in a planar manner from a thickness direction of the movable plate, a first axis portion that connects the movable plate and the frame body portion and oscillatably supports the movable portion around a first oscillation axis, a second axis portion that oscillatably supports the frame body portion around a second oscillation axis, which intersects the first oscillation axis, and a permanent magnet provided in the frame body portion, in which the movable portion has a projection portion, which is disposed overlapping the first oscillation axis within a region that does not overlap with the permanent magnet when viewed in a planar manner, and which projects, from the movable plate, further to the permanent magnet side than the first axis portion.

According to such an optical scanner, since the projection portion, which projects further than the first axis portion, is disposed on the movable plate overlapping the first oscillation axis when viewed in a planar manner, it is possible to reduce dynamic bending of the movable plate without increasing the thickness of the first axis portion. In addition, since the projection portion is disposed within a region that does not overlap with the permanent magnet when viewed in a planar manner, it is possible to prevent or reduce a circumstance in which the projection portion comes into contact with the permanent magnet when the movable portion oscillates around the first oscillation axis relative to the frame body portion. As a result of such a configuration, it is possible to reduce dynamic bending of the movable plate and realize highly-accurate optical scanning characteristics while reducing an increase in the size of the optical scanner in conjunction with an increase in the thickness of the first axis portion.

In the optical scanner according to the aspect of the invention, it is preferable that an external form of the projection portion in plan view have a section that constitutes a shape that follows an outer periphery of the movable plate.

In this case, it is possible to accurately dispose the projection portion in a section in which it is likely that dynamic bending of the movable plate will occur. Therefore, it is possible to more effectively reduce dynamic bending of the movable plate.

In the optical scanner according to the aspect of the invention, it is preferable that the permanent magnet have a long shape, and an external form of the projection portion in plan view have a section that constitutes a shape that extends along a longer side direction of the permanent magnet.

In this case, it is possible to increase the length of the projection portion in a direction following the first oscillation axis and enhance the rigidity of the projection portion while preventing or reducing a circumstance in which the projection portion comes into contact with the permanent magnet. Therefore, it is possible to more effectively reduce dynamic bending of the movable plate.

In the optical scanner according to the aspect of the invention, it is preferable that an external form of the projection portion in plan view constitute a shape that is symmetric to the first oscillation axis.

In this case, design of the movable portion is facilitated. In addition, since the permanent magnet normally passes through an intersection of the first oscillation axis and the second oscillation axis when viewed in a planar manner, and is disposed extending in a direction that is inclined relative to the oscillation axes, when the external form of the projection portion is configured to have a shape that is symmetric to the first oscillation axis in plan view in addition to the projection portion being disposed overlapping the first oscillation axis when viewed in a planar manner, and consequently, the projection portion is not provided at an end portion on a far side of the movable plate relative to the first oscillation axis. Therefore, it is possible to decrease the inertia of the movable portion around the first oscillation axis. As a result of decreasing the inertia of the movable portion around the first oscillation axis, there is also the advantage of being able to further reduce dynamic bending of the movable plate.

In the optical scanner according to the aspect of the invention, it is preferable that the frame body portion have a rib that projects further to the permanent magnet side than the first axis portion or the second axis portion.

In this case, it is possible to enhance the rigidity of the frame body portion. In addition, the rib functions as a spacer that prevents or reduces a circumstance in which the movable portion comes into contact with the permanent magnet.

In the optical scanner according to the aspect of the invention, it is preferable that the projection portion be configured by the same material as the rib.

In this case, it is possible to form the projection portion and the rib simply and with high accuracy from the same layer or the same substrate.

In the optical scanner according to the aspect of the invention, it is preferable that the rib have a positioning portion that is capable of positioning the permanent magnet relative to the frame body portion.

In this case, it is possible to dispose the permanent magnet in a desired position on the frame body portion simply and with high accuracy. Therefore, it is possible to efficiently manufacture an optical scanner capable of preventing or reducing a circumstance in which the projection portion comes into contact with the permanent magnet when the movable portion oscillates around the first oscillation axis relative to the frame body portion.

In the optical scanner according to the aspect of the invention, it is preferable that the positioning portion be recessed on an inner side from an outer periphery of the rib when viewed in a planar manner.

In this case, it is possible to decrease the inertia of the frame body portion around the second oscillation axis. Therefore, it is possible to decrease a drive force required for oscillation of the frame body portion, and as a result, it is possible to achieve miniaturization of the mechanism that causes the drive force to be generated, and consequently, further miniaturization of the optical scanner.

In the optical scanner according to the aspect of the invention, it is preferable that the positioning portion have a stepped portion that engages with the permanent magnet.

In this case, it is possible to dispose the permanent magnet in a desired position on the frame body portion more simply and with higher accuracy.

According to another aspect of the invention, there is provided an image display device including the optical scanner according to the aspect of the invention.

According to such an image display device, since it is possible to reduce dynamic bending of the movable plate, it is possible to perform high quality image display.

According to still another aspect of the invention, there is provided a head-mounted display including the optical scanner according to the aspect of the invention.

According to such a head-mounted display, since it is possible to reduce dynamic bending of the movable plate, it is possible to perform high quality image display. In addition, since it is possible to reduce the size of the optical scanner, in addition to achieving a reduction in the weight of the head-mounted display, possible to enhance the degree of freedom of design.

According to still another aspect of the invention, there is provided a heads-up display including the optical scanner according to the aspect of the invention.

According to such a heads-up display, since it is possible to reduce dynamic bending of the movable plate, it is possible to perform high quality image display.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of an optical scanner, an image display device, a head-mounted display, and a heads-up display will be described with reference to the appended drawings.

Optical Scanner

Figure 1:
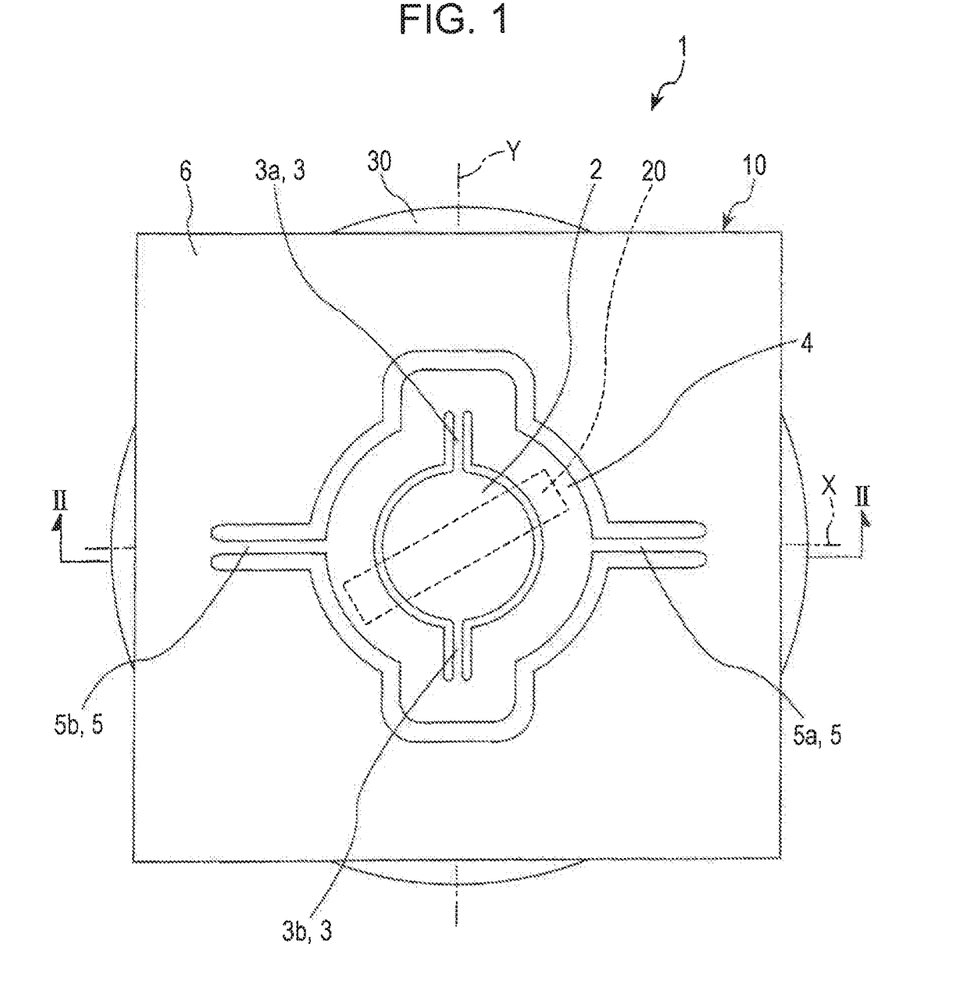
FIG. 1 is a plan view that shows an optical scanner according to an embodiment of the invention.
Figure 2:
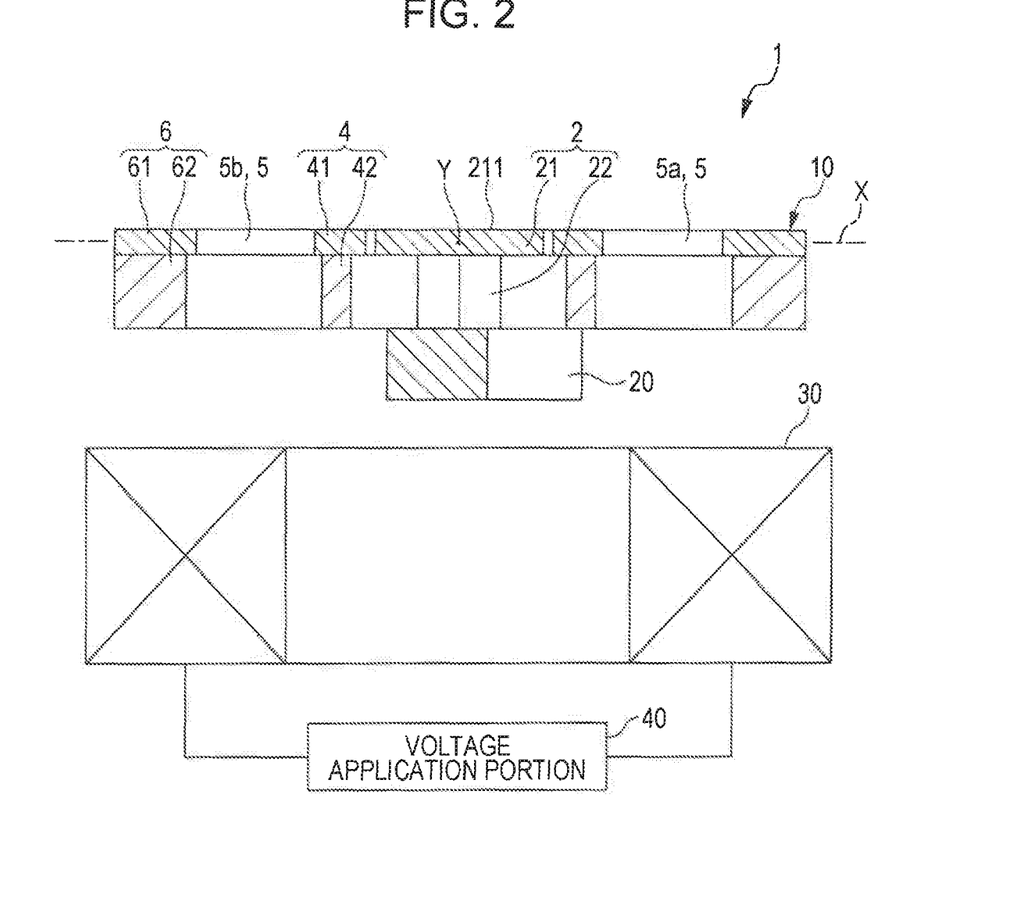
FIG. 2 is a cross-sectional view taken along line II-II in FIG. 1.

FIG. 1 is a plan view that shows an optical scanner according to an embodiment of the invention. FIG. 2 is a cross-sectional view taken along line II-II in FIG. 1. Additionally, hereinafter, for convenience of description, the upper side in FIG. 2 will be referred to as "up", and the lower side "down".

An optical scanner 1 shown in FIGS. 1 and 2 is provided with a structural body 10 having a vibration system, a permanent magnet 20 that is joined to a lower portion of the structural body 10, a coil 30 that is disposed facing the permanent magnet 20 toward a side opposite the structural body 10, and a voltage application portion 40 electrically connected to the coil 30.

In this instance, as shown in FIG. 1, the structural body 10 is provided with a movable portion 2, a first axis portion 3, a frame body portion 4, a second axis portion 5, and a support portion 6. The movable portion 2 and the first axis portion 3 configure a first vibration system, which is a torsional vibration system in which the movable portion 2 is set as a "first mass" and the first axis portion 3 is set as a "first spring" that deforms in a torsional manner around a Y axis (a first oscillation axis). In addition, the movable portion 2, the first axis portion 3, the frame body portion 4, the second axis portion 5, and the permanent magnet 20 configure a second vibration system, which is a torsional vibration system in which the movable portion 2, the first axis portion 3, the frame body portion 4, and the permanent magnet 20 are set as an integral "second mass" and the second axis portion 5 is set as a "second spring" that deforms in a torsional manner around the X axis (a second oscillation axis). Further, the permanent magnet 20, the coil 30, and the voltage application portion 40 configure a "drive portion" that causes the first vibration system and the second vibration system mentioned above to vibrate at different frequencies to one another, and causes the movable portion 2 to oscillate (pivot in a reciprocating manner) around the X axis and the Y axis as a result of mutual interaction of the magnetic fields of the permanent magnet 20 and the coil 30. Hereinafter, firstly, each portion of the optical scanner 1 will be briefly described in order.

As shown in FIG. 2, the movable portion 2 has a movable plate 21 and a projection portion 22 that is joined to the lower surface of the movable plate 21.

The light reflecting portion 211, which has a light reflecting property, is provided on the upper surface (one surface) of the movable plate 21. The light reflecting portion 211 may be the upper surface itself of the movable plate 21, but for example, may, according to necessity, be configured by using a metal film such as aluminum. In the present embodiment, the movable plate 21 constitutes a circular form when viewed in a planar manner from a thickness direction of the movable plate 21 (hereinafter, simply referred to as "when viewed in a planar manner"). Additionally, a plan view shape of the movable plate 21 is not limited to this configuration, and for example, may be elliptical, or polygonal such as rectangular, hexagonal, and octagonal.

The projection portion 22, which projects further to the lower side than the first axis portion 3, is provided on the lower surface of such a movable plate 21. The projection portion 22 is disposed overlapping the Y axis (the first oscillation axis) in a region that does not overlap with the permanent magnet 20 when viewed in a planar manner, and projects, from the movable plate 21, further to the permanent magnet 20 side than the first axis portion 3. As a result of this, it is possible to reduce dynamic bending of the movable plate 21 while reducing an increase in the size of the optical scanner 1. Additionally, the projection portion 22 will be explained in detail later.

As shown in FIG. 1, when viewed in a planar manner, such a movable portion 2 is surrounded by the frame form frame body portion 4. Further, the movable portion 2 is oscillatably supported around the Y axis by the frame body portion 4 via the first axis portion 3. In addition, the frame body portion 4 is oscillatably supported around the X axis, which is orthogonal to the Y axis, by the support portion 6 via the second axis portion 5. In this manner, the components are disposed in an order of the support portion 6, the frame body portion 4 and the movable portion 2 from the outer side toward the inner side when viewed in a planar manner.

The frame body portion 4 constitutes a shape that follows the external form of the first vibration system (the movable portion 2 and the first axis portion 3) when viewed in a planar manner. As a result of this, it is possible to achieve miniaturization of the frame body portion 4 while allowing oscillation of the movable portion 2 around the Y axis. In addition, the frame body portion 4 is formed so that a gap from the first vibration system when viewed in a planar manner is constant. As a result of this, it is possible to form the first vibration system simply and with high accuracy by using etching. Additionally, the plan view shape of the frame body portion 4 is not limited to the illustrated shape, and for example, at least one of the inner peripheral edge and the outer peripheral edge when viewed in a planar manner may be a shape that constitutes a rectangular form, a circular form, or an elliptical form.

As shown in FIG. 2, the frame body portion 4 has a main body portion 41 and a rib 42 that is joined to the lower surface of the main body portion 41. The rib 42 projects from the main body portion 41 to a side that is lower than the second axis portion 5. As a result of this, it is possible to enhance the rigidity of the frame body portion 4. In addition, the rib 42 also has a function of controlling so that the movable portion 2 does not come into contact with the permanent magnet 20 (a function as a spacer). Additionally, the rib 42 will be explained in detail later together with the projection portion 22 of the movable portion 2.

As shown in FIG. 1, the first axis portion 3 is configured by a pair of first axis portions 3a and 3b that extend along a Y axis direction from both end portions of the movable plate 21 of the movable portion 2 in the Y axis direction. The pair of first axis portions 3a and 3b are provided concentrically with one another, and function as torsion bars that deform in a torsional manner in accordance with oscillation of the movable portion 2 around the Y axis. Meanwhile, the second axis portion 5 is configured by a pair of second axis portions 5a and 5b that extend along the X axis from both end portions of the main body portion 41 of the frame body portion 4 in an X axis direction. The pair of second axis portions 5a and 5b are provided concentrically with one another, and function as torsion bars that deform in a torsional manner in accordance with oscillation of the frame body portion 4 around the X axis. Additionally, in the illustration, the first axis portions 3a and 3b and the second axis portions 5a and 5b respectively constitute shapes that extend in a linear manner (rod forms), but are not limited to the illustrated shapes, and for example, may have bent or curved sections, branched sections, or sections having different widths in at least one location midway therealong.

The support portion 6 is provided so as to surround the above-mentioned structure composed of the movable portion 2, the first axis portion 3, the frame body portion 4, and the second axis portion 5 when viewed in a planar manner. As shown in FIG. 2, the support portion 6 has a main body portion 61 and a reinforcing portion 62 that is joined to the lower surface of the main body portion 61. The reinforcing portion 62 projects from the main body portion 61 to a side that is lower than the second axis portion 5. As a result of this, it is possible to enhance the rigidity of the support portion 6. Additionally, the shape of the support portion 6 is not limited to the illustrated shape and is arbitrary as long as the shape is capable of stably supporting the second axis portion 5.

The movable plate 21 of the movable portion 2, the first axis portion 3, the main body portion 41 of the frame body portion 4, the second axis portion 5, and the main body portion 61 of the support portion 6, which are described above, have equivalent thicknesses to one another and are formed in an integral manner by using silicon. In addition, the projection portion 22 of the movable portion 2, the rib 42 of the frame body portion 4 and the reinforcing portion 62 of the support portion 6 have equivalent thicknesses to one another and are respectively configured by silicon. Such a structural body 10 is formed by using etching an SOI substrate obtained by stacking a device layer configured by silicon, a box layer configured by a silicon oxide film, and a handle layer configured by silicon in this order. As a result of this, it is possible to comparatively easily form a structural body 10 in a compact manner having excellent dimensional precision.

In this instance, the movable plate 21, the first axis portion 3, the main body portion 41, the second axis portion 5, and the main body portion 61 are configured by the device layer of the SOI substrate. In addition, the projection portion 22, the rib 42 and the reinforcing portion 62 are configured by the handle layer of the SOI substrate. In addition, although not illustrated in the drawings, a joining layer, which is configured by the box layer of the SOI substrate, is respectively interposed between the movable plate 21 and the projection portion 22 of the movable portion 2, the main body portion 41 and the rib 42 of the frame body portion 4, and the main body portion 61 and the reinforcing portion 62 of the support portion 6. Additionally, the constituent materials and formation methods of the structural body 10, which is mentioned above, are merely examples, and the invention is not limited to these examples. For example, the structural body 10 may be formed by etching a single silicon substrate.

The permanent magnet 20 is joined to the lower surface (a surface on the side opposite the light reflecting portion 211), that is a tip end surface of the rib 42, of the frame body portion 4 that such a structural body 10 includes. The joining method thereof is not particularly limited, but for example, it is possible to use a joining method that uses an adhesive agent.

The permanent magnet 20 is magnetized in a direction that is inclined relative to the X axis and the Y axis when viewed in a planar manner. In the present embodiment, the permanent magnet 20 constitutes a long shape (a rod form) that extends in a direction that is inclined relative to the X axis and the Y axis. Further, the permanent magnet 20 is magnetized in the longer side direction. That is, the permanent magnet 20 is magnetized so that one end portion thereof is configured as an S pole and the other end portion thereof is configured as an N pole. For example, a neodymium magnet, a ferrite magnet, a samarium cobalt magnet, an alnico magnetic, a bonded magnet, or the like, can be suitably used as such a permanent magnet 20.

In addition, an angle of inclination θ in a direction of magnetization (a direction of extension) of the permanent magnet 20 with respect to the X axis when viewed in a planar manner is not particularly limited, but is preferably at least 30° and at most 60°, and is more preferably at least 30° and at most 45°. In this manner, by providing the permanent magnet 20, it is possible to smoothly and reliably cause the movable portion 2 to pivot around the X axis and the Y axis while allowing a suitable shape and disposition of the projection portion 22, which will be mentioned later.

The coil 30 is provided directly below the permanent magnet 20. That is, the coil 30 is provided so as to face the lower surface of the frame body portion 4. The coil 30 is electrically connected to the voltage application portion 40. Further, a magnetic field in a direction orthogonal to the X axis and the Y axis is generated from the coil 30 as a result of a voltage being applied to the coil 30 by the voltage application portion 40.

Although not illustrated in the drawings, the voltage application portion 40 is provided with a first drive circuit that causes a first voltage (a horizontal scan drive signal) for causing the movable portion 2 to pivot around the Y axis to be generated, a second drive circuit that causes a second voltage (a vertical scan drive signal) for causing the movable portion 2 to pivot around the X axis to be generated, and an adder that overlap: the first voltage and the second voltage. Further, the voltage application portion 40 inputs a voltage obtained by overlapping the first voltage and the second voltage to the coil 30. In this instance, the first voltage and the second voltage are signals for which the voltages respectively change in different periods from one another. More specifically, for example, the frequency of the first voltage is set to be equivalent to a torsional resonance frequency of the first vibration system, which is mentioned above, and the frequency of the second voltage is set so as to be a value that is different from the torsional resonance frequency of the second vibration system and so as to be less than the frequency of the first voltage. For example, the frequency of the first voltage is set to be approximately at least 10 kHz and at most 40 kHz, and the frequency of the second voltage is set to be approximately at least 30 Hz and at most 120 Hz.

When such a voltage obtained by overlapping the first voltage and the second voltage is input to the coil 30, a magnetic field is generated from the coil 30, an electromagnetic force is applied to the permanent magnet 20, which is within the magnetic field, and the movable portion 2 oscillates around the Y axis at the frequency of the first voltage and oscillates around the X axis at the frequency of the second voltage.

Each portion of the optical scanner 1 has been briefly described above. Hereinafter, the projection portion 22 and the rib 42 of the optical scanner 1 will be explained in detail.

Figure 3:
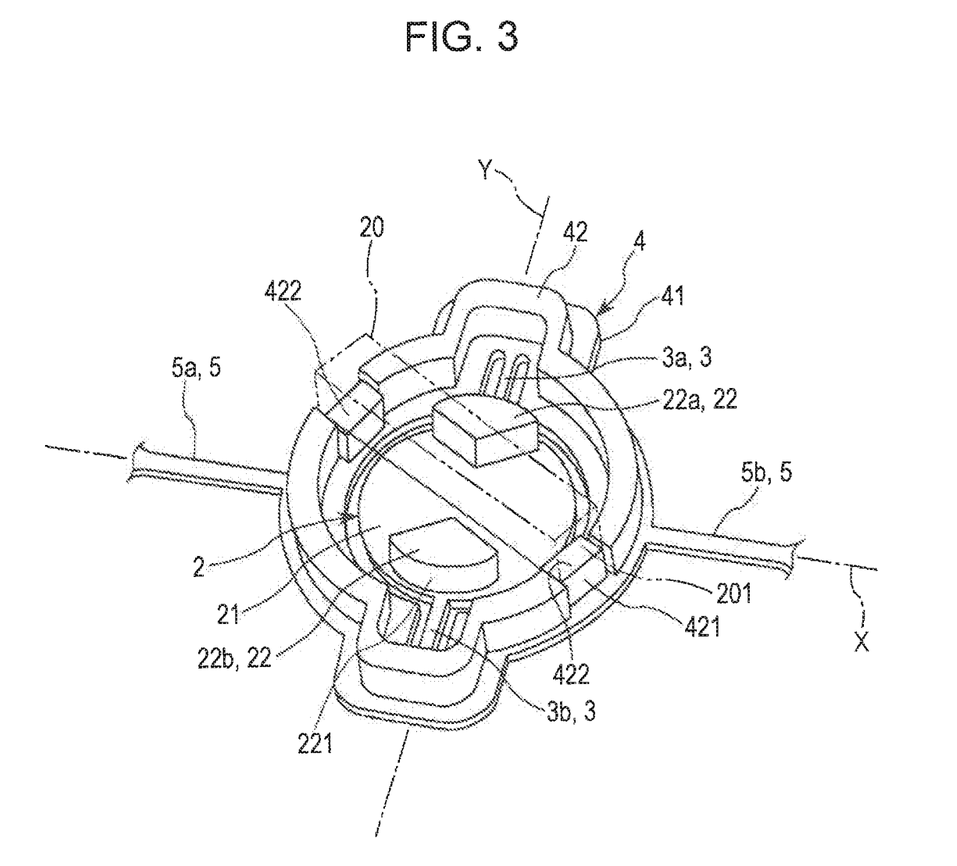
FIG. 3 is a perspective view in which a movable portion, a frame body portion, and first and second axis portions that the optical scanner shown in FIG. 1 includes are viewed from the coil side.
Figure 4:
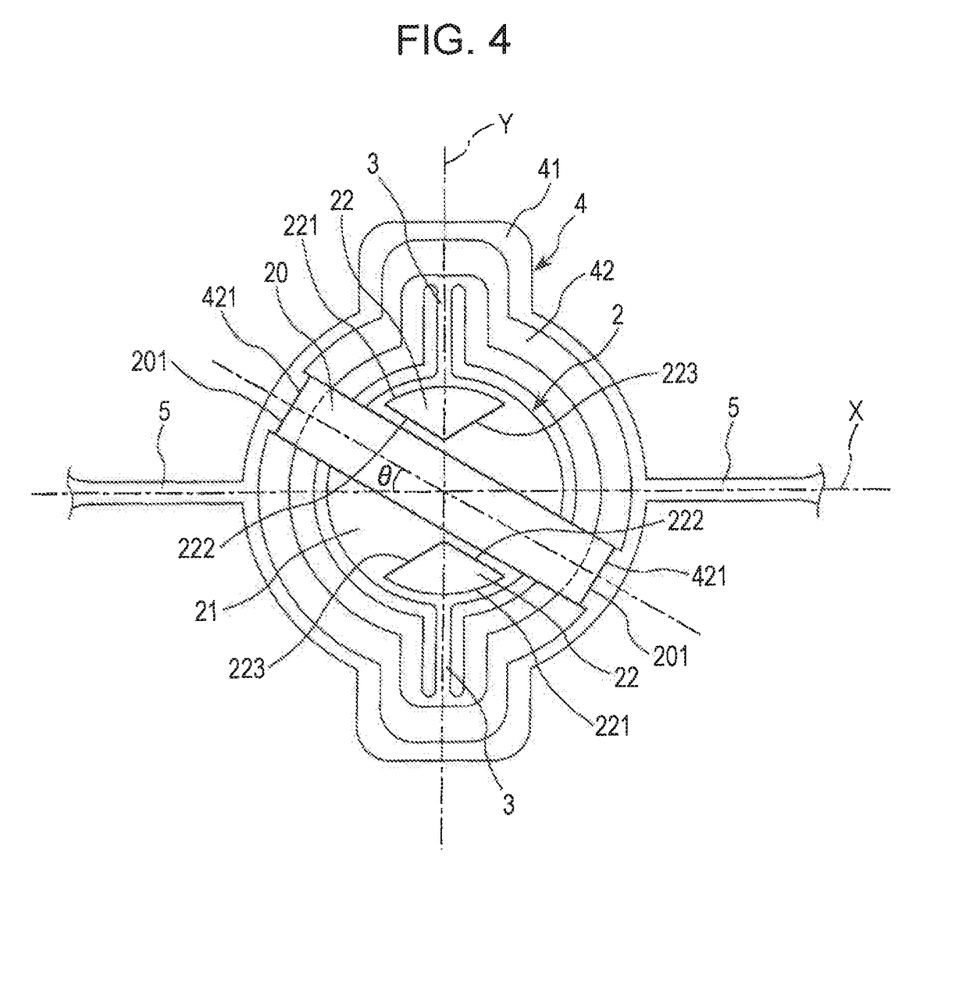
FIG. 4 is a view (a rear surface view) in which the movable portion, the frame body portion, the first and second axis portions, and the permanent magnet that the optical scanner shown in FIG. 1 includes are viewed from the coil side.
Figure 5:
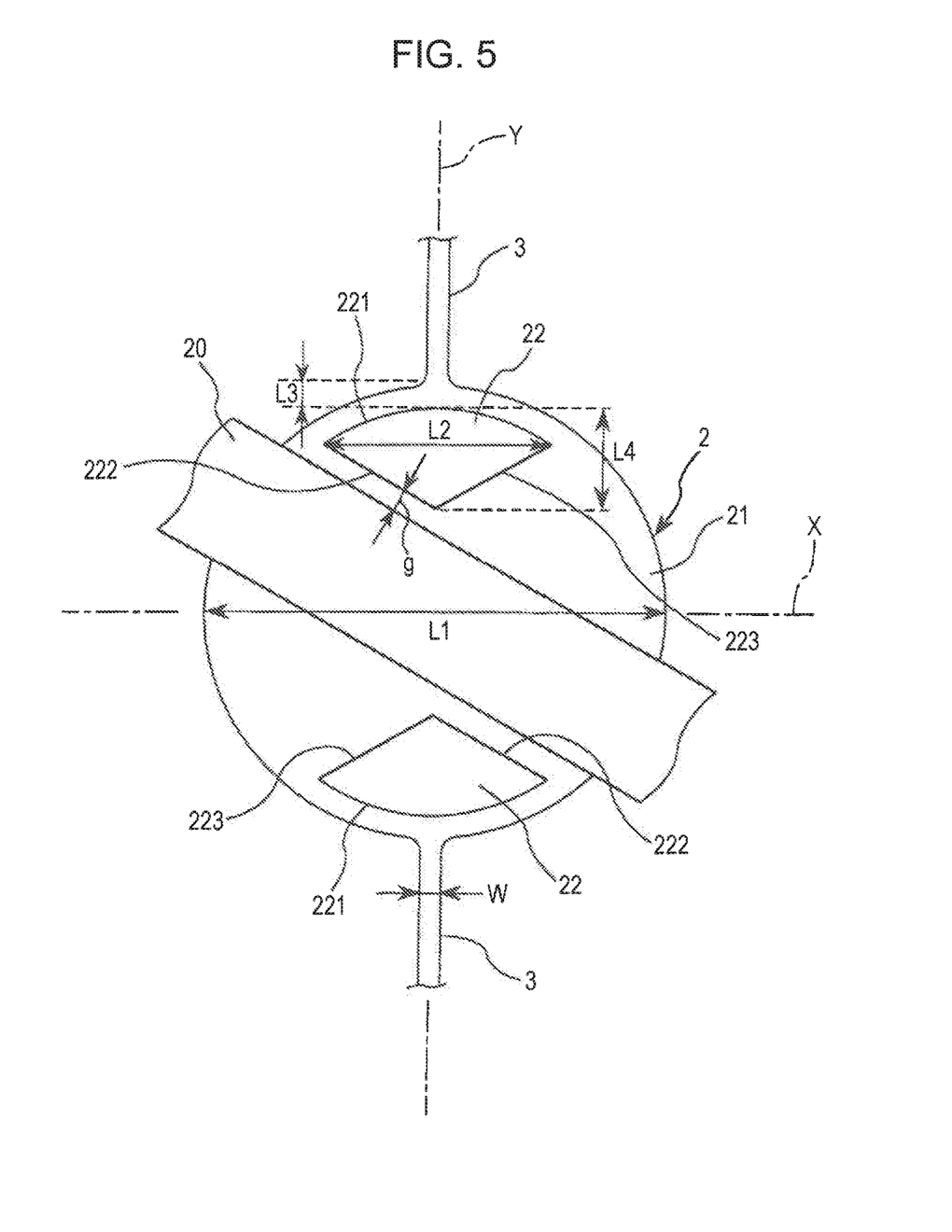
FIG. 5 is an enlarged view for describing a projection portion shown in FIG. 4.
Figure 6:
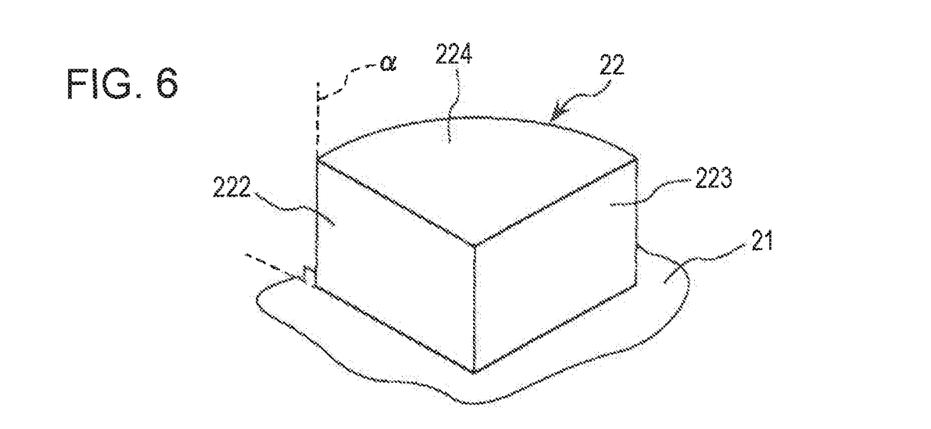
FIG. 6 is a perspective view for describing a side surface shape of the projection portion shown in FIG. 4.
Figure 7:
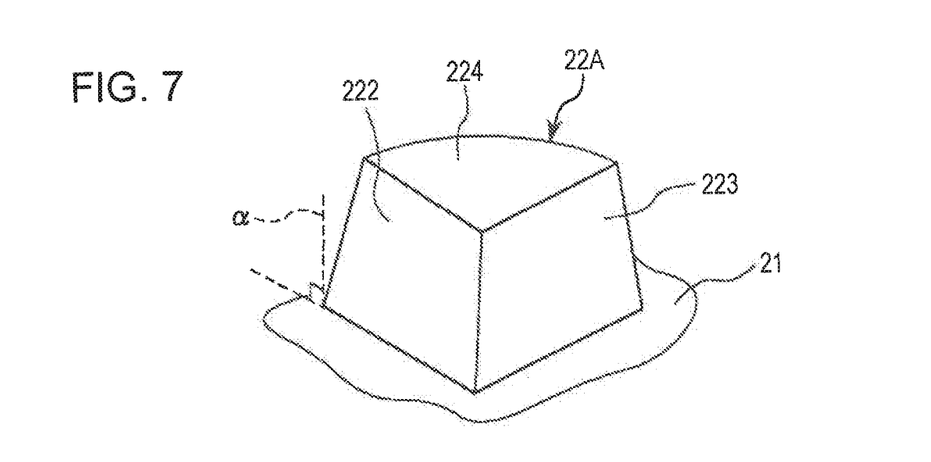
FIG. 7 is a perspective view for describing a modification example of a side surface shape of the projection portion shown in FIG. 4.
Figure 8:
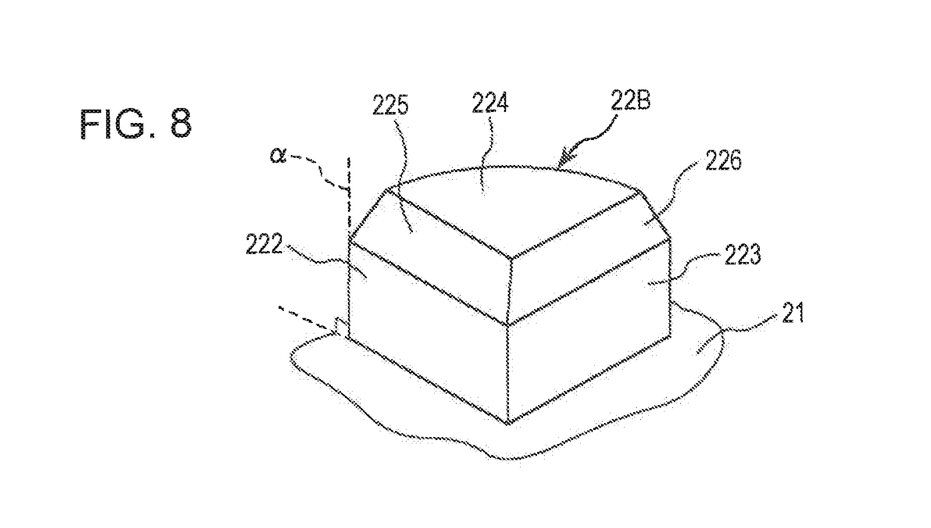
FIG. 8 is a perspective view for describing another modification example of the side surface shape of the projection portion shown in FIG. 4.

FIG. 3 is a perspective view in which a movable portion, a frame body portion, and first and second axis portions that the optical scanner shown in FIG. 1 includes are viewed from the coil side. FIG. 4 is a view (a rear surface view) in which the movable portion, the frame body portion, the first and second axis portions, and the permanent magnet that the optical scanner shown in FIG. 1 includes are viewed from the coil side. FIG. 5 is an enlarged view for describing a projection portion shown in FIG. 4. FIG. 6 is a perspective view for describing a side surface shape of the projection portion shown in FIG. 4. FIG. 7 is a perspective view for describing a modification example of the side surface shape of the projection portion shown in FIG. 4. FIG. 8 is a perspective view for describing another modification example of the side surface shape of the projection portion shown in FIG. 4.

In the above-mentioned manner, the optical scanner 1 is provided with the movable portion 2 having the movable plate 21 on which the light reflecting portion 211 that reflects light is provided, the frame body portion 4 provided surrounding the movable portion 2 when viewed in a planar manner from the thickness direction of the movable plate, the first axis portion 3 that connects the movable plate 21 and the frame body portion 4 and oscillatably supports the movable portion 2 around the Y axis, which is the "first oscillation axis", the second axis portion 5 that oscillatably supports the frame body portion 4 around the X axis, which is the "second oscillation axis" that intersects the Y axis, and the permanent magnet 20, which is provided in the frame body portion 4 (refer to FIGS. 3 and 4). In particular, as shown in FIG. 4, the projection portion 2 has the projection portion 22, which is disposed overlapping the Y axis (the first oscillation axis) in a region that does not overlap with the permanent magnet 20 when viewed in a planar manner, and projects, from the movable plate 21, further to the permanent magnet 20 side than the first axis portion 3.

According to such an optical scanner 1, since the projection portion 22, which projects further than the first axis portion 3, is disposed overlapping the Y axis (the first oscillation axis) when viewed in a planar manner, the movable plate 21 is effectively reinforced by the projection portion 22 without increasing the thickness of the first axis portion 3, and therefore, it is possible to reduce dynamic bending of the movable plate 21. In addition, since the projection portion 22 is disposed within a region that does not overlap with the permanent magnet 20 when viewed in a planar manner, it is possible to prevent or reduce a circumstance in which the projection portion 22 comes into contact with the permanent magnet 20 when the movable portion 2 oscillates around the Y axis (the first oscillation axis) relative to the frame body portion 4. As a result of such a configuration, it is possible to reduce dynamic bending of the movable plate 21 and realize highly-accurate optical scanning characteristics while reducing an increase in the size of the optical scanner 1 in conjunction with an increase in the thickness of the first axis portion 3.

In contrast to this, if the projection portion 22 were to be omitted, it would be necessary to increase the thickness of the entire movable plate 21 in order to reduce dynamic bending of the movable plate 21. In this instance, since the thickness of the movable plate 21 is equivalent to the thickness of the first axis portion 3, the thickness of the first axis portion 3 is also increased in conjunction with an increase in the thickness of the movable plate 21. When this occurs, it is necessary to increase the length of the first axis portion 3 in accordance with the increase in the thickness of the first axis portion 3 so that the first axis portion 3 attains a desired spring constant. This leads to an increase in the overall size of the optical scanner 1.

In the present embodiment, as shown in FIGS. 3 and 4, the projection portion 22 has a projection portion 22a, which is provided on an end portion (in the vicinity of a connection portion with the first axis portion 3a) on the first axis portion 3a side of the movable plate 21, and a projection portion 22b, which is provided on an end portion (in the vicinity of a connection portion with the first axis portion 3b) on the first axis portion 3b side of the movable plate 21. The projection portion 22a and 22b are provided symmetrically relative to respective axes of the X axis and the Y axis when viewed in a planar manner. In addition, the projection portion 22a and 22b respectively constitute fan forms having circular arcs that follow the outer periphery (the external form) of the movable plate 21 when viewed in a planar manner. More specifically, as shown in FIGS. 4 and 5, the external forms of the projection portion 22a and 22b in plan view respectively have a section 221 that follows the outer periphery of the movable plate 21, a section 222 that follows the side surface of the permanent magnet 20, and a section 223 that links the sections 221 and 222. When viewed in a planar manner, the section 221 constitutes a circular arc form, and the sections 222 and 223 constitute linear forms.

In this manner, the external form of the projection portion 22 in plan view has the section 221 that constitutes a shape that follows the outer periphery of the movable plate 21. As a result of this, it is possible to accurately dispose the projection portion 22 in a section in which it is likely that dynamic bending of the movable plate 21 will occur. Therefore, it is possible to more effectively reduce dynamic bending of the movable plate 21.

In addition, in the above-mentioned manner, the permanent magnet 20 constitutes a long shape. Further, the external form of the projection portion 22 in plan view has the section 222 that constitutes a shape that follows the longer side direction of the permanent magnet 20. As a result of this, it is possible to increase the length of the projection portion 22 (the projection portion 22a and 22b) in a direction following the Y axis (the first oscillation axis) and enhance the rigidity of the projection portion 22 while preventing or reducing a circumstance in which the projection portion 22 comes into contact with the permanent magnet 20. Therefore, it is possible to more effectively reduce dynamic bending of the movable plate 2.

In addition, the external form (the entire shape in plan view) of the projection portion 22 when viewed in a planar manner constitutes a shape that is symmetric to the Y axis, which is the "first oscillation axis". As a result of this, design of the movable portion 2 is facilitated. In addition, in the manner of the present embodiment, since the permanent magnet 20 normally passes through an intersection of the Y axis (the first oscillation axis) and X axis (the second oscillation axis) when viewed in a planar manner, and is disposed extending in a direction that is inclined relative to the oscillation axes, when the projection portion 22 being disposed overlapping the Y axis (the first oscillation axis) when viewed in a planar manner and the external form of the projection portion 22 is configured to have a shape that is symmetric to the Y axis (the first oscillation axis) in plan view, the projection portion 22 is consequently not provided at an end portion on a far side of the movable plate 21 relative to the Y axis (the first oscillation axis). Therefore, it is possible to decrease the inertia of the movable portion 2 around the Y axis (the first oscillation axis). As a result of decreasing the inertia of the movable portion 2 around the Y axis (the first oscillation axis), there is also the advantage of being able to further reduce dynamic bending of the movable plate 21.

If the dimensions of the projection portion 22 are explained in more detail, when the length of the movable plate 21 following the X axis direction is defined as L1, and the length of the projection portions 22 (the respective lengths of the projection portion 22a and 22b) following the X axis direction is defined as L2, it is preferable that L2/L1 be at least ¼ and at most ⅔, and at least ⅓ and at most ⅔ is more preferable. As a result of this, it is possible to accurately bring about a reinforcing effect of the movable plate 21 by the projection portion 22 while reducing the inertia of the movable portion 2 around the Y axis. In addition, it is possible to ensure a required angle of inclination θ of the permanent magnet 20. In contrast to this, when L2/L1 is set to be too small, depending on the plan view shape of the projection portion 22, there is a tendency for the reinforcing effect of the movable plate 21 by the projection portion 22 to be decreased. Meanwhile, when L2/L1 is set to be too large, depending on the plan view shape of the projection portion 22, a gap g between the projection portion 22 and the permanent magnet 20 is decreased, it is necessary to decrease the angle of inclination θ of the permanent magnet 20 more than necessary and the degree of freedom of the design of the optical scanner 1 is degraded as a result, and the like.

In addition, when the length of the projection portions 22 (the respective lengths of the projection portion 22a and 22b) following the Y axis direction is defined as L4, it s preferable that L4/L1 be at least ⅛ and at most ⅓, and at least ⅙ and at most ⅓ is more preferable. As a result of this, it is possible to accurately bring about a reinforcing effect of the movable plate 21 by the projection portion 22. In contrast to this, when L4/L1 is set to be too small, depending on the plan view shape of the projection portion 22, there is a tendency for the reinforcing effect of the movable plate 21 by the projection portion 22 to be decreased. Meanwhile, when L4/L1 is set to be too large, depending on the plan view shape of the projection portion 22, a gap g between the projection portion 22 and the permanent magnet 20 is decreased, it is necessary to decrease the width of the permanent magnet 20 more than necessary and the degree of freedom of the design of the optical scanner 1 is degraded as a result, and the like.

In addition, when the length (width) of the first axis portion 3 following the X axis direction is defined as W and the distance between the projection portion 22 and the first axis portion 3 is defined as L3, it is preferable that L3/W be at least ½ and at most 3/2, and at least ⅔ and at most 4/3 is more preferable. As a result of this, it is possible to reduce a circumstance in which an excessive amount of stress is generated at the end portion on the movable portion 2 side of the first axis portion 3 while accurately bringing about a reinforcing effect of the movable plate 21 by the projection portion 22. In addition, it is preferable that L3 be at least 10 μm and at most 100 μm. When L3 is less than 10 μm, in a case in which alignment shifting of the movable plate 21 and the projection portion 22 occurs, the section 221 of the projection portion 22 approaches the first axis portion 3, and the first axis portion 3 is susceptible to fracture due to the concentration of stress that occurs at the end portion on the movable portion 2 side of the first axis portion 3. In addition, when L3 is set to 100 μm or more, the effect of reducing dynamic bending of the movable plate 21 is decreased.

In addition, the frame body portion 4 has a rib 42 that projects further to the permanent magnet 20 side than the first axis portion 3 or the second axis portion 5. As a result of this, it is possible to enhance the rigidity of the frame body portion 4. In addition, the rib 42 functions as a spacer that prevents or reduces a circumstance in which the movable portion 2 comes into contact with the permanent magnet 20.

In this instance, as mentioned earlier, the projection portion 22 is configured by the same material as the rib 42. As a result of this, it is possible to form the projection portion 22 and the rib 42 simply and with high accuracy from the same layer or the same substrate.

In addition, as shown in FIGS. 3 and 4, the rib 42 has positioning portions 421 and 422 that are capable of positioning the permanent magnet 20 relative to the frame body portion 4. The positioning portion 421 and the positioning portion 422 are configured by flat surfaces that are orthogonal to one another, the positioning portion 421 is capable of establishing the position of the permanent magnet 20 in the longer side direction, and the positioning portion 422 is capable of establishing the position of the structural body 10 in the thickness direction (the up-down direction in FIG. 2). As a result of providing such positioning portions 421 and 422, it is possible to dispose the permanent magnet 20 in a desired position on the frame body portion 4 simply and with high accuracy. Therefore, it is possible to efficiently manufacture an optical scanner 1 capable of preventing or reducing a circumstance in which the projection portion 22 comes into contact with the permanent magnet 20 when the movable portion 2 oscillates around the Y axis (the first oscillation axis) relative to the frame body portion 4.

The positioning portion 421 is recessed on the inner side from the outer periphery of the rib 42 when viewed in a planar manner. As a result of this, it is possible to position both end portions 201 of the permanent magnet 20 further on the inner side than an outer peripheral surface of the rib 42, it is possible to avoid contact with the both end portions 201, and it is possible to decrease the inertia of the frame body portion 4 and the permanent magnet 20, which is installed therein, around the X axis (the second oscillation axis). Therefore, it is possible to decrease a drive force required for oscillation of the frame body portion 4, and as a result, it is possible to achieve miniaturization of the mechanism that causes the drive force to be generated, and consequently, further miniaturization of the optical scanner 1. In addition, when the positioning portion 421 is recessed in the above-mentioned manner, when the permanent magnet 20 is joined to the rib 42 by using an adhesive agent, it is possible to suppress a circumstance in which the adhesive agent spills out onto the outer side of the frame body portion 4.

In this instance, a pair of positioning portions 421 are provided with the movable plate 21 interposed therebetween when viewed in a planar manner, and the distance between the pair of positioning portions 421 is equivalent to the length of the permanent magnet 20. As a result of this, it is possible to perform positioning of the permanent magnet 20 relative to the frame body portion 4 by matching the positions of the both end portions 201 of the permanent magnet 20 and the pair of positioning portions 421. Additionally, the configuration is not limited to this, and the length of the permanent magnet 20 may be longer than the distance between the pair of positioning portions 421.

In addition, the positioning portion 422 is formed in a recessed manner in a tip end surface of the rib 42, and has a stepped portion that engages with the upper surface of the permanent magnet 20. As a result of this, irrespective of the height of the rib 42, it is possible to dispose the permanent magnet 20 in a desired position on the frame body portion 4 even more simply and with higher accuracy by adjusting the height (the position in the up-down direction in FIG. 2) of the positioning portion 422.

Additionally, even if either one of the positioning portions 421 and 422 is omitted, it is possible to perform positioning of the permanent magnet 20 relative to the frame body portion 4. For example, the positioning portion 422 may be omitted and the lower surface of the rib 42 may be configured to be a flat surface that does not have a recessed portion due to the positioning portion 422. In this case, it is possible to manufacture the rib 42 having the positioning portion 421 in a single process.

MODIFICATION EXAMPLE

In the above-mentioned embodiment, in the projection portions 22, as shown in FIG. 6, the section 222 is perpendicular to the plate surface of the movable plate 21, but the section 222 may be inclined relative to the plate surface of the movable plate 21 in the manner of the projection portion 22A shown in FIG. 7 so that the cross-sectional area of the projection portion 22 decreases toward a tip end surface 224, or a chamfered portion 225, which is inclined relative to the plate surface of the movable plate 21, may be provided between the section 222 and the tip end surface 224 in the manner of the projection portion 22B shown in FIG. 8. In this case, it is possible to more accurately prevent or reduce a circumstance in which the projection portion 22 comes into contact with the permanent magnet 20 while accurately bringing about the reinforcing effect of the movable plate 21 by the projection portion 22.

In this instance, in the projection portion 22A shown in FIG. 7, the symmetric property of the shape of the projection portion 22A is ensured by causing the section 223 to be inclined in a similar manner to the section 222. In addition, in the projection portion 22E shown in FIG. 8, the symmetric property of the shape of the projection portion 22B is ensured by also providing a chamfered portion 226, which is similar to the chamfered portion 225, between the section 223 and the tip end surface 224. In addition, in the projection portions 22, 22A, and 22E, a similar chamfered portion (not illustrated in the drawings) may be provided at an intersecting portion of the section 222 and the section 223. Additionally, in FIGS. 6 to 8, for convenience of description, a normal line α of the movable plate 21 is illustrated.

Embodiment of Image Display Device

Figure 9:
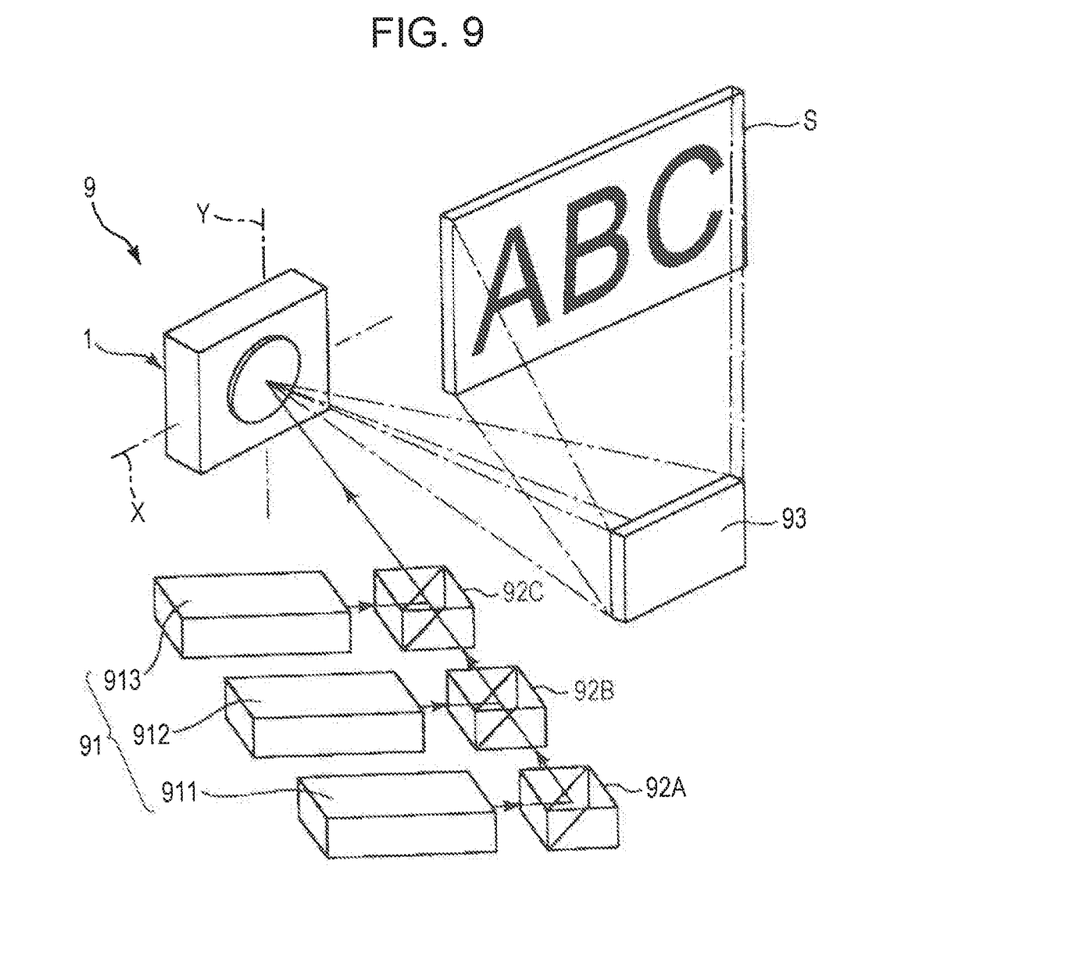
FIG. 9 is a view that schematically shows an image display device according to an embodiment of the invention.

FIG. 9 is a view that schematically shows an embodiment of an image display device of the invention.

In the present embodiment, a case in which the optical scanner 1 is used as an optical scanner of a display for imaging will be described as an example of an image display device. Additionally, a longer side direction of a screen S will be referred to as a "lateral direction", and a direction perpendicular to the longer side direction will be referred to as a "longitudinal direction". In addition, the X axis is parallel to the lateral direction of the screen S, and the Y axis is parallel to the longitudinal direction of the screen S.

An image display device (projector) 9 has a light source device (a light source) 91 that emits a light such as a laser, a plurality of dichroic mirrors 92A, 92B, and 92C, and the optical scanner 1.

The light source device 91 is provided with a red light source device 911 that emits red light, a blue light source device 912 that emits blue light, and a green light source device 913 that emits green light.

Each of the dichroic mirrors 92A, 92B, and 92C is an optical element that synthesizes the light respectively emitted from the red light source device 911, the blue light source device 912, and the green light source device 913.

Such an image display 9 is configured so that light emitted from the light source device 91 (the red light source device 911, the blue light source device 912, and the green light source device 913) is respectively synthesized by the dichroic mirrors 92A, 92B, and 92C on the basis of image information from a host computer not illustrated in the drawings, the synthesized light is two-dimensionally scanned by the optical scanner 1, and a color image is formed on the screen S.

During the two-dimensional scanning, light reflected by the light reflecting film 114 is scanned (a main scan) in the lateral direction of the screen S as a result of pivoting of the movable portion 2 of the optical scanner 1 around the Y axis. Meanwhile, light reflected by the light reflecting film 114 scanned (a sub-scan) in the longitudinal direction of the screen S as a result of pivoting of the movable portion 2 of the optical scanner 1 around the X axis.

Such an image display device 9 is provided with an optical scanner 1 such as that mentioned above. According to such an image display device 9, since it is possible to reduce dynamic bending of the movable plate 21, it is possible to perform high quality image display.

Additionally, in FIG. 9, a configuration in which, after light synthesized by the dichroic mirrors 92A, 92B, and 92C is two-dimensionally scanned by the optical scanner 1, an image is formed on the screen S after reflecting the light by using a fixed mirror 93 is used, but the fixed mirror 93 may be omitted, and the screen S may be directly irradiated with the light two-dimensionally scanned by the optical scanner 1.

Hereinafter, application examples of image display devices will be described.

Application Example 1 of Image Display Device

Figure 10:
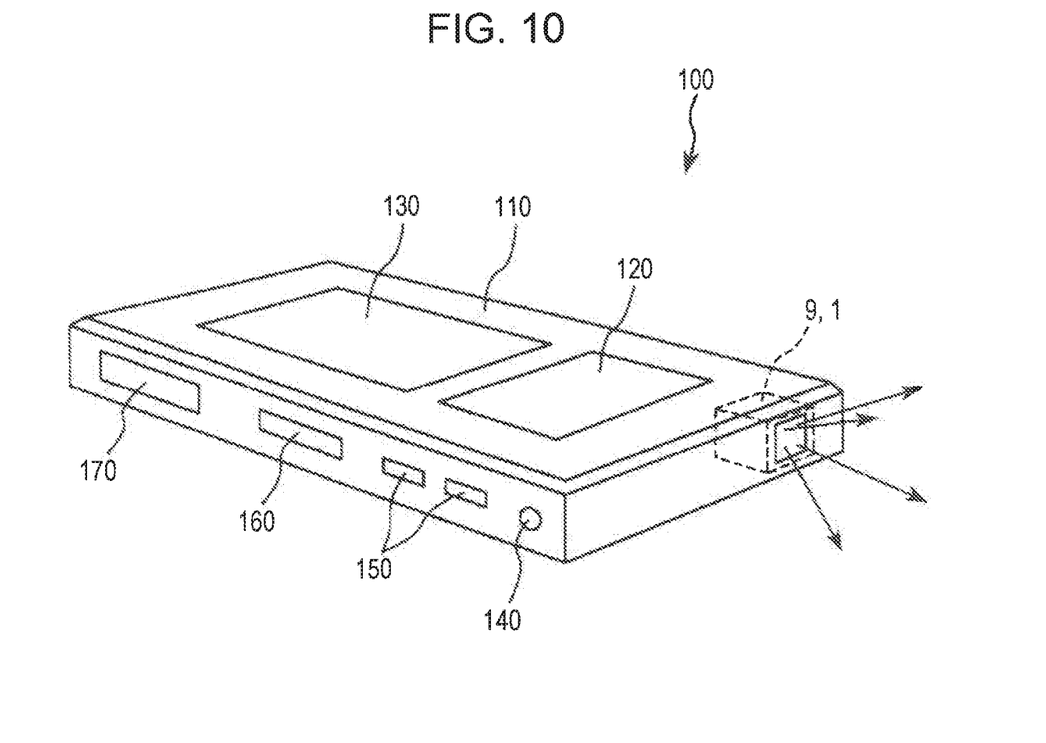
FIG. 10 is a perspective view that shows Application Example 1 (a portable image display device) of the image display device according to an embodiment of the invention.

FIG. 10 is a perspective view that shows Application Example 1 (a portable image display device) of the image display device of the invention.

As shown in FIG. 10, the image display device 9 can be applied to a portable image display device 100.

The portable image display device 100 has a casing 110 formed to dimensions that can be gripped by a hand, and the image display device 9, which is built into the casing 110. As a result of the portable image display device 100, for example, it is possible to display a predetermined image on a screen or a predetermined surface on a desk, or the like.

In addition, the portable image display device 100 has a display 120 that displays predetermined information, a keypad 130, an audio port 140, a control button 150, a card slot 160, and an AV port 170.

Additionally, the portable image display device 100 is provided with a telephone calling, and other functions such as a GPS reception function.

Application Example 2 of Image Display Device

Figure 11:
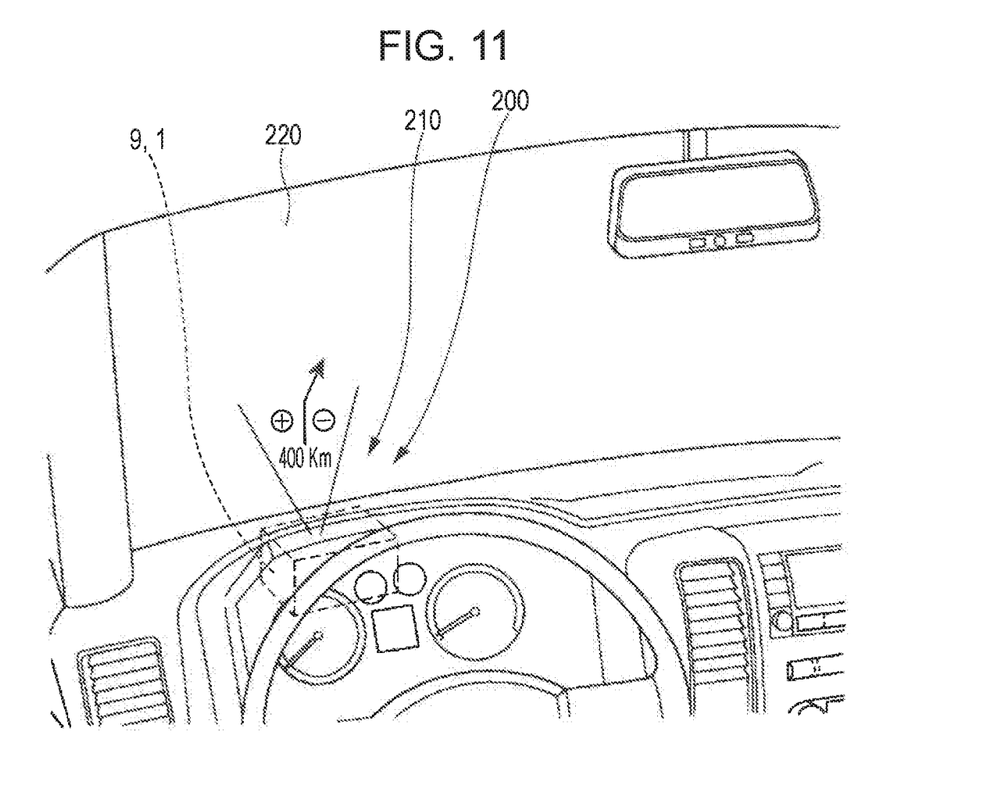
FIG. 11 is a perspective view that shows Application Example 2 (a heads-up display) of the image display device according to an embodiment of the invention.

FIG. 11 is a perspective view that shows Application Example 2 (a heads-up display) of the image display device of the invention.

As shown in FIG. 11, the image display device 9 can be applied to a heads-up display system 200.

In the heads-up display system 200, the image display device 9 is mounted on a dashboard of an automobile so as to configure a heads-up display 210. As a result of the heads-up display 210, for example, it is possible to display a predetermined image such as a guide display to a destination, for example, on a front glass 220.

Such a heads-up display 210 is provided with an optical scanner 1 such as that mentioned above. According to such a heads-up display 210, since it is possible to reduce dynamic bending of the movable plate 21, it is possible to perform high quality image display.

Additionally, the heads-up display system 200 is not limited to an automobile, and for example, can be applied to an aircraft, a ship, or the like.

Application Example 3 of Image Display Device

Figure 12:
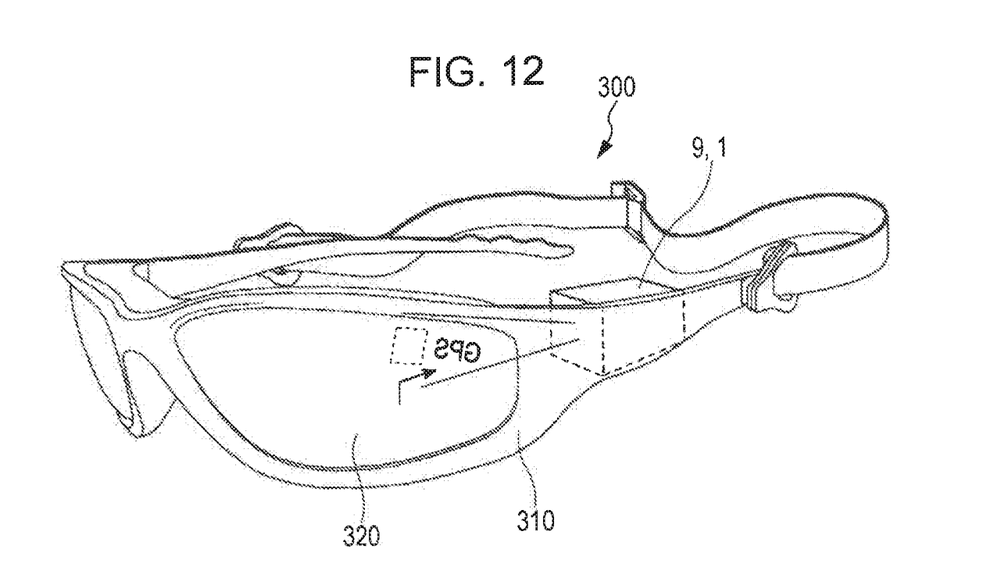
FIG. 12 is a perspective view that shows Application Example 3 (a head-mounted display) of the image display device according to an embodiment of the invention.

FIG. 12 is a perspective view that shows Application Example 3 (a head-mounted display) of the image display device of the invention.

As shown in FIG. 12, the image display device 9 can be applied to a head-mounted display 300.

That is, the head-mounted display 300 has eye glasses 310, and the image display device 9 mounted in the eye glasses 310. Further, as a result of the image display device 9, a predetermined image to be visually recognized by one eye is displayed on a display portion 320 provided in a location, which is ordinarily a lens, of the eye glasses 310.

The display portion 320 may be transparent, or may be opaque. In a case in which the display portion 320 is transparent, use by adding information from the image display device 9 to information from the real world is possible.

A head-mounted display 300 such as that mentioned above is provided with an optical scanner 1 such as that mentioned earlier. According to such a head-mounted display 300, since it is possible to reduce dynamic bending of the movable plate 21, it is possible to perform high quality image display. In addition, since it is possible to reduce the size of the optical scanner 1, in addition to achieving a reduction in the weight of the head-mounted display 300, it is possible to enhance the degree of freedom of design.

Additionally, two image display devices 9 may be provided in the head-mounted display 300, and an image to be visually recognized by both eyes may be displayed on two display portions.

An optical scanner, an image display device, a head-mounted display, and a heads-up display of the invention have been described above on the basis of illustrated embodiments, but the invention is not limited to these embodiments. For example, the configurations of each portion of the invention can be substituted with arbitrary configurations that have similar functions, and in addition, it is also possible to add arbitrary configurations.

In addition, in the above-mentioned embodiment, a case in which the plan view shape of the projection portion of the movable portion constitutes a fan form is described, but the external form of the projection portion when viewed in a planar manner is not limited to this configuration, and as long as a shape that is capable of reducing dynamic bending of the movable plate and is capable of preventing or reducing contact with the permanent magnet is used, may be triangular, rectangular, or the like. In addition, in the above-mentioned embodiment, the external form of the projection portion when viewed in a planar manner has a section that follows the outer periphery of the movable plate, but the external form of the corresponding section is established as appropriate depending on the plan view shape of the movable plate. For example, in a case in which the plan view shape of the movable plate is rectangular, or the like, the external form may extend along an edge of the movable plate in a linear manner. Additionally, for example, the external form of the projection portion when viewed in a planar manner need not necessarily have a section that follows the external form of at least one of the movable plate and the permanent magnet, or may be asymmetric relative to the first oscillation axis.

The entire disclosure of Japanese Patent Application No. 2016-190000, filed Sep. 28, 2016 is expressly incorporated by reference herein

What is claimed is:

1. An optical scanner comprising:
   a movable plate that includes a light reflecting portion and a projection portion;
   a frame body portion that surrounds the movable plate in a plan view from a thickness direction of the movable plate;
   a first axis portion that connects the movable plate and the frame body portion and oscillatably supports the movable plate around a first oscillation axis;
   a second axis portion that oscillatably supports the frame body portion around a second oscillation axis that intersects the first oscillation axis; and
   a permanent magnet disposed in the frame body portion, wherein
   in the plan view, the projection portion is disposed in a first region overlapping the light reflecting portion and the first oscillation axis,
   in the plan view, the permanent magnet is disposed in a second region overlapping the light reflecting portion, the second region is different from the first region and does not overlap the first region, and
   a thickness of the projection portion is larger than a thickness of the first axis portion in the thickness direction.

2. The optical scanner according to claim 1,
   wherein in the plan view, the projection portion has a section shaped like an outer periphery of the movable plate.

3. An image display device comprising the optical scanner according to claim 2.

4. The optical scanner according to claim 1,
   wherein the permanent magnet has an elongated shape, and
   in the plan view, the projection portion has a section that extends along an elongation direction of the permanent magnet.

5. An image display device comprising the optical scanner according to claim 4.

6. The optical scanner according to claim 1,
   wherein in the plan view, the projection portion is symmetric about the first oscillation axis.

7. An image display device comprising the optical scanner according to claim 6.

8. The optical scanner according to claim 1,
   wherein the frame body portion has a rib,
   a thickness of the rib is larger than the thickness of the first axis portion or a thickness of the second axis portion in the thickness direction.

9. The optical scanner according to claim 8,
   wherein the projection portion is composed of a same material as the rib.

10. An image display device comprising the optical scanner according to claim 9.

11. The optical scanner according to claim 8,
    wherein the rib has a positioning portion that positions the permanent magnet relative to the frame body portion.

12. The optical scanner according to claim 11,
    wherein the positioning portion is recessed on an inner side from an outer periphery of the rib when viewed in the plan view.

13. An image display device comprising the optical scanner according to claim 12.

14. The optical scanner according to claim 11,
    wherein the positioning portion has a stepped portion that engages with the permanent magnet.

15. An image display device comprising the optical scanner according to claim 11.

16. An image display device comprising the optical scanner according to claim 8.

17. An image display device comprising the optical scanner according to claim 1.

18. A head-mounted display comprising the optical scanner according to claim 1.

19. A heads-up display comprising the optical scanner according to claim 1.

20. The optical scanner according to claim 1, wherein
the movable plate has a first surface facing the permanent magnet and a second surface facing away from the permanent magnet, and
the projection portion projects from the first surface towards the permanent magnet.

\* \* \* \* \*